United States Patent [19]

Wanek

[11] 3,843,838

[45] Oct. 22, 1974

[54] MUTING CIRCUIT FOR VIDEO AND AUDIO PLAYBACK SYSTEM

[75] Inventor: Paul Victor Wanek, Mount Prospect, Ill.

[73] Assignee: Warwick Electronics Inc., Chicago, Ill.

[22] Filed: Mar. 16, 1973

[21] Appl. No.: 342,316

[52] U.S. Cl. .................... 178/5.8 R, 360/33, 360/69
[51] Int. Cl. .............................................. G11b 5/00
[58] Field of Search ....................... 178/6.6 A, 5.8 R; 179/100.2 S; 360/33, 69

[56] References Cited

UNITED STATES PATENTS 3,721,774 3/1973 Yonemoto .................. 179/100.2 S

*Primary Examiner*—Howard W. Britton
*Attorney, Agent, or Firm*—Hofgren, Wegner, Allen, Stellman & McCord

[57] ABSTRACT

A video tape recorder includes an electronic muting circuit for temporarily muting the audio portion of a recorded signal when the recorder is switched from the playback to the standby mode of operation, in response to a voltage level change on a line. After the lapse of a predetermined time period, during which transient signals are generated due to a change in acceleration of the video tape, an RC network disables a semiconductor muting switch to allow use of an audio amplifier by other apparatus associated with the video tape recorder.

3 Claims, 2 Drawing Figures

PATENTED OCT 22 1974

3,843,838

SHEET 1 OF 2

MUTING CIRCUIT FOR VIDEO AND AUDIO PLAYBACK SYSTEM

BACKGROUND OF THE INVENTION

This invention relates to a muting circuit for reproduced signals derived from a video and audio playback system associated with a television receiver.

When a video tape recorder (VTR) is switched from a playback to a standby mode of operation, the video tape is driven at an accelerated speed for a transient period of time, such as 10 to 15 seconds. This results in a rapid variation in the audio signal, creating an unintelligible signal which is coupled to the audio section of a television receiver. The unintelligible signals produce what is generally designated as "monkey chatter". While it is possible to defeat the operation of the audio circuit, it is also desirable to be able to utilize the audio circuit for peripheral equipment often associated with a VTR, such as a microphone or a record player.

SUMMARY OF THE INVENTION

In accordance with the present invention, a novel muting circuit for a VTR temporarily disables an audio amplifier circuit when the VTR is switched from the playback to the standby mode of operation. After the lapse of a predetermined time period, selected to be just longer than the transient period during which the video tape is driven at a change in velocity, the muting circuit is defeated in order to allow the audio amplifier circuit to be available for use with peripheral equipment.

The muting circuit utilizes a control signal already present within the VTR unit. The signal may comprise a switched power supply voltage having fixed DC levels which may be used to signify the mode of the operation of the VTR. The muting action is automatically initiated only for a particular voltage level change in a particular direction, in a power supply voltage. A discharge circuit associated with a capacitor controls the time duration of the muting action, and disables a semiconductor muting switch after the lapse of a desired time period.

One object of this invention is the provision of a muting circuit for reproduced signals stored on a recording medium in a television playback system, which muting circuit includes time delay means for defeating the muting action after the lapse of a predetermined time period.

Further objects and features of the invention will be apparent from the following description, and from the drawings. While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated.

DESCRIPTION OF THE PREFERRED EMBODIMENT

Figure 1:
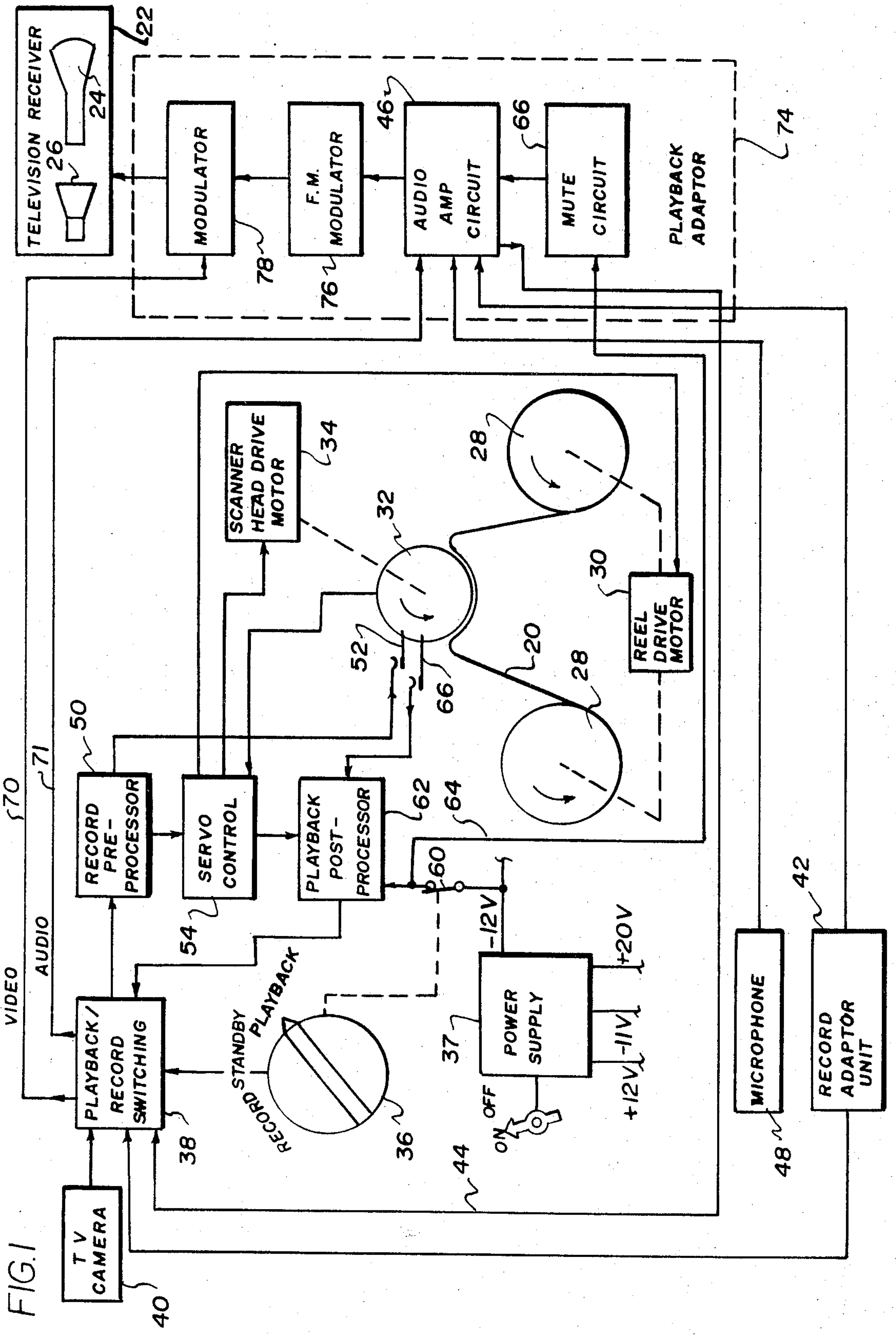
FIG. 1 is a block diagram of a television playback system incorporating the novel muting circuit.

Turning to FIG. 1, a video tape recorder (VTR) includes a recording medium 20, such as magnetic tape, which stores video, audio, and synchronizing signals which are to be reproduced by a conventional television receiver 22. The receiver includes a video image reproducer 24, such as a tribeam color cathode ray tube, and an audio reproducer 26, such as a dynamic loudspeaker. A pair of storage tape reels 28 are driven by a reel drive motor 30 in order to move the tape medium 20 past a scanner head assembly 32 which may include three magnetic heads spaced approximately 120° apart. The scanner head assembly 32 is rotated at a high speed (such as 1,200 rpm) by a scanner head drive motor 34 past the relatively slow moving tape (driven for example at 3.8 IPS).

The scanner head assembly 32 and tape 20 are mounted so that the tape moves on a diagonal to the plane of scanner rotation, as is conventional in a VTR, to produce a series of helical tracks each of which records one field of video information. Three linear tracks are also provided on the tape, comprising two audio tracks and one control track which contains a series of pulses corresponding to the recorded vertical fields.

A mode switch 36 controls a playback/record switching circuit 38, and a switch (to be described) concerned with power supply voltages from a power supply 37. The switching circuit 38 includes a plurality of inputs connected, for example, to a television camera 40, a record adapter unit 42 for a record player, and an audio output line 44 of an audio amplifier circuit 46 which may have an input from a microphone 48 used in conjunction with the television camera 40. An additional input, not illustrated for clarity, is coupled from the television receiver 22, in order to record live television programs which are being received.

A selected one of the inputs is coupled, when mode switch 36 is in a "record" position, by switching circuit 38 to a record pre-processor 50 for transmission to a record input 52 of the scanner head assembly 32. The record pre-processor 50 generates control signals for a servo control 54 which controls the speed of the reel drive motor 30 and the scanner head drive motor 34. Conservation of the recording medium requires that the composite video signal be modified in terms of both reduced information density and upper frequency limit. Reduction of total bandwidth is accomplished within record pre-processor 50. Information density may be further reduced by employing a technique known as skip field recording, in which only every third field is recorded. This may be accomplished by coupling the record input 52 to only one of the three heads within the scanner head assembly 32.

When it is desired to playback stored video and audio signals, which may have been locally recorded or may be contained on a pre-recorded program reel, the mode switch 36 is switched to a "playback" mode, causing a single pole, single throw switch 60 to close and connect a power supply voltage, such as −12 volts DC, to a playback post-processor 62 and to a control line 64 coupled to a mute circuit 66, to be described later. As the servo control 54 drives the pair of motors 30 and 34, the video and audio information stored on tape 20 is detected by all three heads within the scanner head assembly 32, producing output information on a playback output 66 which is coupled to the now activated playback post-processor 62. The reproduced information is then coupled to the playback/record switching circuit 38 for coupling over a video line 70 and an audio line 71.

Since all three heads within scanner head assembly 32 are active in playback, three duplicate fields are reproduced for each complete rotation of the scanner head assembly. Thereafter, the next recorded odd or even field is played back in order to maintain interlacing. The three heads are mechanically staggered to cause each head to read the same track during a single revolution of the disk.

The control track on the tape produces output pulses used by servo control 54 to control the instantaneous speed (position) of the scanner head assembly 32 during playback, assuring proper tracking of the heads relative to the video information. Basically, the scanner head assembly 32 is servoed or electronically controlled by vertical sync pulses during the record mode, and is servoed or electronically controlled by the control track during the playback mode.

The output video and audio information is coupled to a playback adaptor 74, which essentially is a low power television transmitter which, in response to the video and audio information on line 70 and 71, produces a composite television signal identical in form to the signal broadcast by a television transmitter. This allows the VTR to be used with a conventional unmodified television receiver 22. Of course, the circuitry within the television receiver can be modified in a known manner, if desired, to directly utilize the video and audio information on lines 70 and 71. The playback adapter 74 is also useful to interface various external accessories, such as television camera 40, microphone 48, and record adapter unit 42, increasing the versatility of the system.

Playback adapter 74 includes audio amplifier circuit 46 which couples an audio output signal to an FM modulator 76 to frequency modulate a 4.5 megahertz carrier signal. The modulated audio output signal is then coupled to a modulator 78 which amplitude modulates a carrier at 67.25 megahertz with the video information on line 70, and mixes the carrier with the 4.5 megahertz FM modulated signal. The resultant composite signal coupled to television receiver 22 is thus identical to a composite television signal broadcast over channel 4. Television receiver 22 then demodulates the composite signal to reproduce the video and audio information on the cathode ray tube 24 and the loudspeaker 26 respectively. The above described VTR system, except for the mute circuit 66 and control line 64, is conventional and may take other forms than described above. If the television receiver 22 is appropriately modified, the playback adapter 74 can be eliminated and the mute circuit 66 can be utilized to directly control the television audio section coupled to loudspeaker 26. Other modifications will be apparent.

When the VTR is switched from the playback mode to a "standby" mode, there is a transient period during which the magnetic tape 20 is driven at an accelerated speed with respect to the scanner head assembly 32. This results in a rapid variation in the audio signal on line 71, which results in unintelligible signals being reproduced by loudspeaker 26. The applicant prevents this objectionable transient response by defeating the operation of the audio amplifier circuit 46 for a temporary interval of 10 to 15 seconds following the switching of the VTR from playback to the standby mode. After the lapse of this time period, the muting of the audio amplifier circuit 46 is released to allow, for example, the microphone 48 or the record adapter unit 42 to be utilized during the standby mode. This is accomplished by monitoring the power supply voltage on line 64, and selectively controlling the mute circuit 66 in accordance with the level and direction of change of the power supply voltage.

Figure 2:
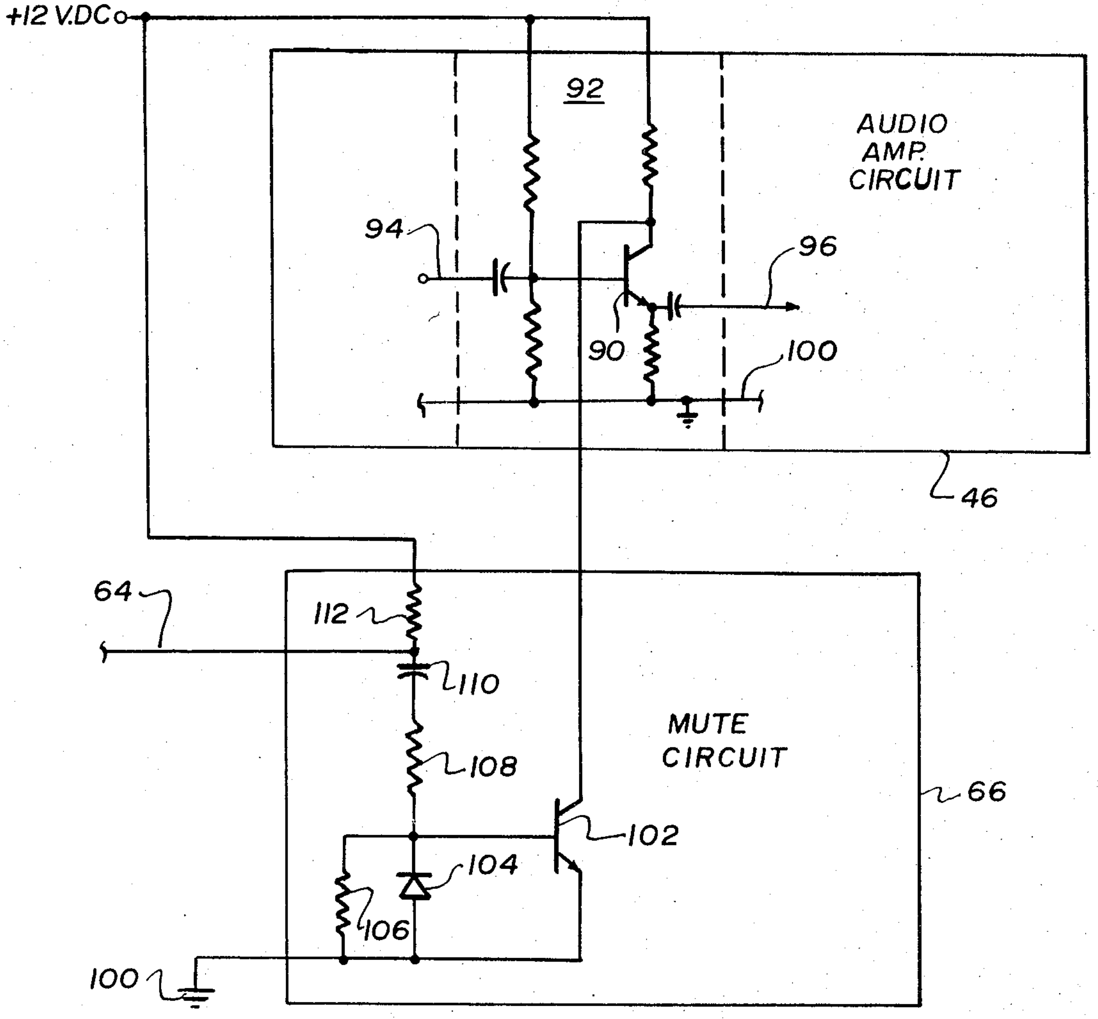
FIG. 2 is a schematic diagram illustrating the muting circuit and a portion of the audio amplifier circuit shown in block form in FIG. 1.

The FIG. 2, the mute circuit 66 is illustrated in detail. The audio amplifier circuit 46 includes an audio amplifier stage 92 consisting of an NPN transistor 90 connected for amplification of an audio signal on an input line 94. The output audio signal on an output line 96 varies with respect to a reference source or ground 100.

Mute circuit 66 includes a NPN transistor 102 having its collector directly connected to the collector of transistor 90, and its base directly connected to ground 100. When the mute transistor 102 is driven into conduction, it shunts the audio amplifier transistor 90 and thereby decouples the output line 96 from the input line 94. The base of mute transistor 102 is coupled to ground through a diode 104 and a 10 kilohm resistor 106, both coupled between the base and ground 100. The base is also coupled to an RC network for establishing a 10 to 15 second time delay, namely a kilohm resistor 108 in series with a 25 microfarad capacitor 110, and a 10 kilohm resistor 112 coupled to a source of positive DC voltage, such as +12 volts. The junction between resistor 112 and capacitor 110 is coupled to control line 64, which carries −12 volts when mode switch 36 is in the playback position, and 0 volts or ground potential when the mode switch is in the standby position.

In operation, it will first be assumed that the VTR is off and the voltage on line 64 is approximately 0 volts. The voltage at the top (coupled to line 64) of capacitor 110 will be at +12 volts due to the charging path from the +12 volts source to ground 100. This causes the bottom (coupled to diode 104) of capacitor 110 to be relatively 12 volts negative with respect to the top. When the VTR unit is switched to the playback mode of operation, a voltage of −12 volts immediately appears on line 64. This clamps the top of capacitor 110 to −12 volts, and thereby forces the bottom of capacitor 110 to drop to approximately −24 volts. This condition forward biases diode 104, and capacitor 110 then charges through the diode and resistor 108 until the bottom of capacitor 110 reaches approximately 0 volts. Since the voltage is entirely negative during this period of time, transistor 102 is not biased into conduction.

When the VTR is now switched from the playback to the standby mode of operation, the voltage on line 64 again experiences a step change in level from −12 volts to 0 volts, forming a predetermined signal which signifies that the mute circuit should be enabled. The top of capacitor 110 again is clamped to +12 volts, but at this time, the bottom of the capacitor is relatively 12 volts higher in potential. Therefore, the bottom of capacitor 110 rises to approximately +24 volts. This voltage is discharged through resistor 108 and resistor 106 to ground 100, forward biasing the transistor 102 for a length of time determined by the time constant of the circuit.

In the present case, the transistor is biased into conduction for approximately 15 seconds, sufficient for any transient response on the audio output line 96 to have dissipated. After the lapse of 15 seconds, the voltage at the junction between resistors 106 and 108 is no longer sufficient to forward bias transistor 102, and the transistor is driven off, thereby disabling the mute circuit 66 in order to allow the audio amplifier 46 to operate normally. The transistor 102 may be replaced by a Darlington transistor pair, to provide extremely rapid switching characteristics. It should be understood that the exemplary component values given above are merely illustrative.

I claim:

1. In a television playback system having a recording medium for storing video and audio signals, signal coupling means for coupling video and audio signals to video and audio reproducer means, and switching means having a playback mode for causing said signal coupling means to couple the signals from the recording medium to the reproducer means and a different mode for effectively preventing the coupling of the signals from the recording medium to the reproducer means, the improvement comprising:

control means for generating on a control line a voltage having a first magnitude when said switching means is in the playback mode and a second magnitude when the switching means is in the different mode, mute means for effectively disabling said signal coupling means including a network coupled to said control line and responsive to a change in voltage from said first magnitude to said second magnitude for activating a disable means in said signal coupling means; and time delay means effective after the lapse of a predetermined time period for disabling said mute means to thereby enable said signal coupling means, said network means includes capacitor means forming a part of said time delay means, a semiconductor device forming said disable means and having a conducting or nonconducting state dependent on the charge on the capacitor means, and means for controlling the charge on the capacitor means by the magnitude of voltage on said control line, the time constant of the time delay means including said capacitor means controlling said predetermined time period.

2. The improvement of claim 1 wherein said capacitor means has first and second sides, means coupling said first side to said control line and to a power supply voltage with a magnitude offset from said first and second magnitudes, and means connecting said second side to said semiconductor device for biasing the same in accordance with the charge on the capacitor means.

3. In a television playback system having a recording medium for storing video and audio signals, signal coupling means for coupling video and audio signals to video and audio reproducer means, a power supply means for generating a plurality of power supply voltages for the television playback system, and switching means having a playback mode for causing said signal coupling means to couple the signals from the recording medium to the reproducer means and a different mode for effectively preventing the coupling of the signals from the recording medium to the reproducer means, said switching means includes a switch device which changes state when switching from the playback mode to the different mode in order to couple or uncouple one of said power supply voltages to a processor means for the video and audio signals from the recording medium, the improvement comprising:

control means for generating a predetermined signal when said switching means is switched from the playback mode to the different mode, including a control line connected to a junction between said switch device and said processor means for causing the switched power supply voltage to form said predetermined signal mute means for effectively disabling said signal coupling means in response to said predetermined signal, including time delay means effective after the lapse of a predetermined time period for disabling said mute means to thereby enable said signal coupling means.

* * * * *